(12) United States Patent
DiMascio et al.

(10) Patent No.: US 9,163,322 B2
(45) Date of Patent: Oct. 20, 2015

(54) METHOD AND APPARATUS FOR REFURBISHING TURBINE COMPONENTS

(71) Applicant: GENERAL ELECTRIC COMPANY, Schenectady, NY (US)

(72) Inventors: Paul Stephen DiMascio, Greer, SC (US); Alston Ilford Scipio, Mableton, GA (US); Dale J. Davis, Greenville, SC (US); Sanji Ekanayake, Mableton, GA (US)

(73) Assignee: General Electric Company, Schenectady, NY (US)

( * ) Notice: Subject to any disclaimer, the term of this patent is extended or adjusted under 35 U.S.C. 154(b) by 162 days.

(21) Appl. No.: 13/932,341

(22) Filed: Jul. 1, 2013

(65) Prior Publication Data

US 2015/0001086 A1    Jan. 1, 2015

(51) Int. Cl.
*B23H 9/10* (2006.01)
*C25F 3/16* (2006.01)
*C25F 7/00* (2006.01)

(52) U.S. Cl.
CPC .. *C25F 3/16* (2013.01); *B23H 9/10* (2013.01); *C25F 7/00* (2013.01)

(58) Field of Classification Search
CPC ...... B23H 9/10; C25F 7/02; C25F 3/16–3/28; C25F 7/00
See application file for complete search history.

(56) References Cited

U.S. PATENT DOCUMENTS

| | | | |
|---|---|---|---|
| 2,928,777 A * | 3/1960 | Smith | 205/675 |
| 4,529,452 A | 7/1985 | Walker | |
| 4,563,257 A | 1/1986 | Sova | |
| 5,032,238 A * | 7/1991 | Ishimura et al. | 205/647 |
| 5,217,586 A | 6/1993 | Datta et al. | |
| 6,482,334 B2 | 11/2002 | Kovalev et al. | |

(Continued)

FOREIGN PATENT DOCUMENTS

| | | | |
|---|---|---|---|
| AU | 2010100306 A4 * | 5/2010 | |
| GB | 676546 A | 7/1952 | |

(Continued)

OTHER PUBLICATIONS

European Search Report and Written Opinion issued in connection with corresponding EP Application No. 14174703.0-1360 on Nov. 5, 2014.

*Primary Examiner* — Nicholas A Smith
(74) *Attorney, Agent, or Firm* — McNees Wallace & Nurick LLC

(57) ABSTRACT

A refurbishing method, refurbishing apparatus and refurbished article are provided. The refurbishing method includes accessing a plurality of rotatable components attached to a turbine assembly, the turbine assembly being a portion of a turbomachine, providing a predetermined volume of a buffered electrolytic solution in an electro-polishing tank, coupling the plurality of rotatable components to a power supply, immersing an immersion portion of at least one of the plurality of rotatable components in the buffered electrolytic solution, passing an electrical energy through the immersion portion of at least one of the plurality of rotatable components while the immersion portion is immersed in the buffered electrolytic solution, wherein an electrical flux to the immersion portion electro-polishes the immersion portion, separating the immersion portion from the buffered electrolytic solution, and applying a corrosion inhibitor to the plurality of rotatable components.

36 Claims, 4 Drawing Sheets

(56) References Cited

U.S. PATENT DOCUMENTS

| | | |
|---|---|---|
| 7,794,581 B2 * | 9/2010 | Kruger et al. ............... 205/643 |
| 2002/0074240 A1 * | 6/2002 | Jaworowski et al. ......... 205/673 |
| 2004/0050715 A1 * | 3/2004 | Zhu et al. ..................... 205/676 |
| 2004/0074783 A1 * | 4/2004 | MacDonald et al. ......... 205/674 |
| 2005/0016867 A1 * | 1/2005 | Kreiskott et al. ............. 205/640 |
| 2006/0091005 A1 * | 5/2006 | Toma et al. ............... 204/290.11 |
| 2006/0131184 A1 * | 6/2006 | Mielke ......................... 205/651 |
| 2007/0295611 A1 * | 12/2007 | Liu et al. ...................... 205/682 |
| 2009/0200178 A1 * | 8/2009 | Piesslinger-Schweiger et al. ............................ 205/680 |
| 2010/0078326 A1 * | 4/2010 | Muramatsu et al. .......... 204/510 |
| 2013/0175183 A1 * | 7/2013 | Williams ...................... 205/661 |
| 2014/0076719 A1 * | 3/2014 | Andreacchi et al. .......... 204/199 |

FOREIGN PATENT DOCUMENTS

| | | |
|---|---|---|
| RU | 2373306 C2 | 11/2009 |
| WO | WO 2011003400 A1 * | 1/2011 |

* cited by examiner

METHOD AND APPARATUS FOR REFURBISHING TURBINE COMPONENTS

FIELD OF THE INVENTION

The present invention is directed to an apparatus and methods for refurbishing turbine components. More specifically, the present invention is directed to an apparatus and methods for electro-polishing turbine components.

BACKGROUND OF THE INVENTION

Gas turbines (GT) are often subjected to harsh operating conditions and prolonged operation times, leading to oxidation and corrosion wear of GT components. For GT compressor rotor blades, these factors cause surface finish degradation, adversely affecting the aerodynamic performance of the blades by increasing the coefficient of drag (CD) and resulting in reduced performance. Usually during major inspections, which are conducted at predetermined intervals, the rotor blades and stator vanes are manually scrubbed and/or cleaned to partially restore the surface finish of the blades and vanes. The scrubbing and/or cleaning of the rotor blades and vanes improves the surface finish, partially restoring GT output and efficiency. However, current methods of cleaning do not fully restore the surface finish to that of a new blade.

Manual scrubbing and/or cleaning of the rotor blades is a time-consuming process which results in a less than optimal surface finish of the blade. An alternative to manual scrubbing and/or cleaning of the rotor blades is electro-polishing of the rotor blades.

Electro-polishing of the rotor blades provides an improved surface finish of the blade, as compared to manual scrubbing. However, current electro-polishing practices require disassembly and/or transportation of the GT. Disassembly and transportation increase the GT downtime, resulting in lost productivity. Down time for transportation of the GT can be up to two months.

A refurbishing method that does not suffer from one or more of the above drawbacks is desirable in the art.

BRIEF DESCRIPTION OF THE INVENTION

The present invention provides a method for refurbishing components, which includes accessing a plurality of rotatable components attached to a turbine assembly, the turbine assembly being a portion of a turbomachine, providing a predetermined volume of a buffered electrolytic solution in an electro-polishing tank, coupling the plurality of rotatable components to a power supply, immersing an immersion portion of at least one of the plurality of rotatable components in the buffered electrolytic solution, passing an electrical energy through the immersion portion of at least one of the plurality of rotatable components while the immersion portion is immersed in the buffered electrolytic solution, wherein an electrical flux to the immersion portion electro-polishes the immersion portion, separating the immersion portion from the buffered electrolytic solution, and applying a corrosion inhibitor to the plurality of rotatable components.

In another exemplary embodiment, an electro-polishing apparatus includes two roller supports for supporting a turbine assembly, a rotor drive for rotating the turbine assembly on the roller supports, an electro-polishing tank positioned below the turbine assembly, a buffered electrolytic solution in the electro-polishing tank, a DC power supply for providing an electrical energy, a power distribution ring coupled to the DC power supply, the power distribution ring distributing the electrical energy from the DC power supply, and power leads, the power leads coupling the power distribution ring to a plurality of rotatable components of the turbine assembly.

In another exemplary embodiment, an electro-polished article includes a turbine assembly, and a plurality of electro-polished rotatable components, the rotatable components attached to the turbine assembly.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary refurbishing apparatus and in-situ refurbishing methods for refurbishing a plurality of rotatable components of a turbine assembly. The rotatable components lose their aerodynamic efficiency after operation in a turbine due to one or more of oxidation, corrosion and/or minor impacts from foreign objects, such as sand or dust which may be ingested, all of which may affect a surface finish of the rotatable components. The type and amount of surface damage is dependent upon the environment in which the turbine operates. For the purposes of this application, in-situ means at the operational site or venue of the turbine. Embodiments of the present disclosure, in comparison to apparatus and methods not utilizing one or more features disclosed herein, decrease turbine downtime, decrease turbine transportation, decrease labor for polishing, increase rotor blade polishing efficiency, increase rotor blade polishing effectiveness, decrease lost productivity, decrease repair/refurbishment costs or a combination thereof.

Figure 1:
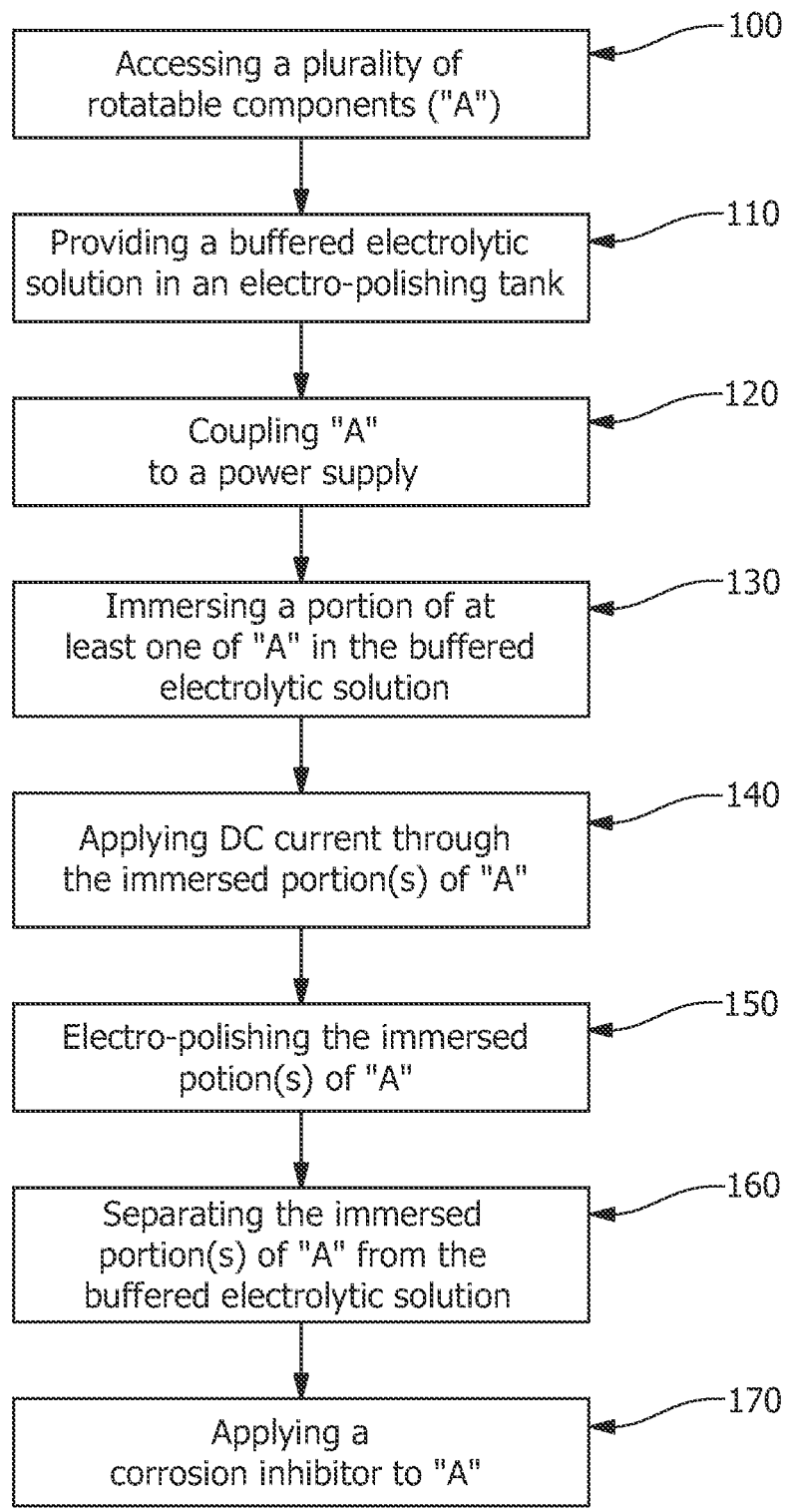
FIG. 1 is a flow chart of a refurbishing method.
Figure 2:
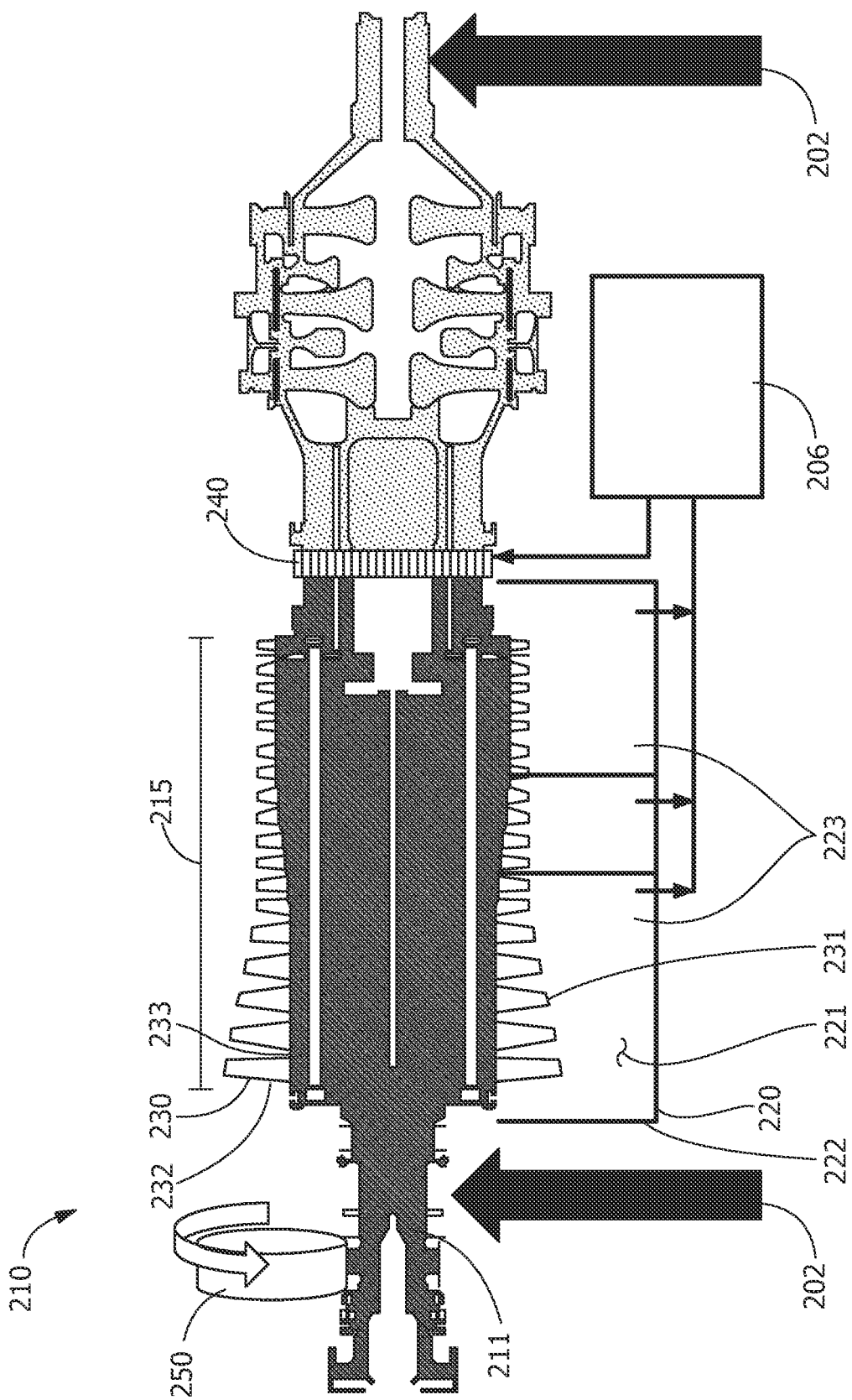
FIG. 2 is a perspective view of a refurbishing system.

In one embodiment, referring to FIG. 1 and FIG. 2, access is provided to a plurality of rotatable components 230 of a turbine assembly 210 (step 100). The plurality of rotatable components 230 include any suitable rotatable components such as turbine blades, stator vanes, or a combination thereof. A predetermined volume of a buffered electrolytic solution 221 is provided in an electro-polishing tank 220 (step 110) and the plurality of rotatable components 230 are coupled to a power supply 206 (step 120). A immersion portion 231 of at least one of the plurality of rotatable components 230 is immersed in the buffered electrolytic solution 221 (step 130). A predetermined amount of a DC current is applied through the immersion portion 231 while the immersion portion 231 is immersed in the buffered electrolytic solution 221 (step 140), wherein the DC current applied to the immersion portion 231 electro-polishes the immersion portion 231 (step 150). The immersion portion 231 having the predetermined surface finish is separated from the buffered electrolytic solution 221 (step 160) and a corrosion inhibitor is spray applied to the plurality of rotatable components 230 (step 170).

Referring to FIG. 2, in one embodiment, during a planned major inspection, the turbine assembly 210 is removed from a turbomachine 200 and placed on roller supports 202, providing access to the plurality of rotatable components 230

(step 100) having immersion portions 231. In one embodiment, the plurality of rotatable components 230 include rotor blades 232. The rotor blades 232 have platform sections affixed to compressor discs 233 which are attached to a turbine shaft or sub-shaft 211 of the turbine assembly 210. The immersion portions 231 of the rotor blades 232 include an airfoil section that extends from the platform section. Exemplary turbine series include, but are not limited to, turbine series 6FA, 7FA, and 9FA produced by General Electric, and the turbine assemblies 210 removed from such series. An electro-polishing region 215 of the turbine assembly 210 is first power washed, then the electro-polishing tank 220 is situated below the turbine assembly 210 and the buffered electrolytic solution 221 is provided in the electro-polishing tank 220 (step 110). The electro-polishing region 215 preferably includes only the immersion portion 231 of the plurality of rotatable component 230. For example, in one embodiment, the electro-polishing region 215 include the airfoil sections of the rotor blades 232, but not the compressor discs 233 and preferably not the platform sections. In one embodiment, the electro-polishing tank 220 situated below the turbine assembly 210 is a stationary tank 222. A power distribution ring 240 is assembled on the turbine assembly 210 and coupled to the plurality of rotatable components 230 and the power supply 206 (step 120). The electro-polishing region 215 is immersed in the buffered electrolytic solution 221 provided in the stationary tank 222 (step 130). The DC current is applied from the power supply 206 through the power distribution ring 240 and to the electro-polishing region 215 (step 140), while the electro-polishing region 215 of the turbine assembly 210 is immersed in the buffered electrolytic solution 221. Passing the DC current for a predetermined time through the immersion portions 231 of the electro-polishing region 215 in the buffered electrolytic solution 221 restores a predetermined surface finish to the immersion portions 231 (step 150). After the immersion portions 231 have been restored to the predetermined surface finish, the turbine assembly 210 is rotated on roller supports 202 to immerse an unpolished portion in the buffered electrolytic solution 221.

Upon completion of electro-polishing the immersed portion(s) 231 (step 150) in the electro-polishing region 215, the turbine assembly 210 is separated from the buffered electrolytic solution 221 (step 160). In one embodiment, the buffered electrolytic solution 221 is removed from the stationary tank 222. The stationary tank 222 is removed from below the turbine assembly 210 and the electro-polishing region 215 is power washed. A dry corrosion inhibitor is applied to the plurality of rotatable components 230 (step 170), preferably by spraying, and the turbine assembly 210 is reassembled to the turbomachine 200 after inspection.

In one embodiment, the stationary tank 222 may include two or more compartments 223 for receiving the buffered electrolytic solution 221. The buffered electrolytic solution 221 in each compartment 223 is maintained at separate predetermined volume levels. In one embodiment, the predetermined volume level is the same for each of the compartments 223 in the stationary tank 222. In one embodiment, the predetermined volume levels differ for at least two of the compartments 223. The predetermined volume level is such that the electro-polishing region 215 of the plurality of rotatable components 230 is immersed in the buffered electrolytic solution 221 while the rest of the turbine assembly 210 is not immersed. In one embodiment, the electro-polishing region 215 has sections corresponding to the compartments 223 in the stationary tank 222. In one embodiment, each of the sections extends a sufficient distance away from a shaft centerline that the immersion portion 231 of each of the plurality of rotatable components 230 may be accommodated in the stationary tank 222 having the buffered electrolytic solution 221 at the predetermined volume level. In one embodiment, at least two of the sections extend a different length away from the shaft centerline, the immersion portions 231 of the plurality of rotatable components 230 extending at lengths sufficiently different that the compartments 223 having the buffered electrolytic solution 221 at different predetermined volume levels are required.

In one embodiment, the buffered electrolytic solution 221 is different in at least two of the compartments 223 in the electro-polishing tank 220. In one embodiment, the buffered electrolytic solution 221 includes an electrolytic compound. The electrolytic compound is selected so that it does not cause damage to the regions not being electro-polished, both during and after the electro-polishing operations. The parameters of the electro-polishing operation are selected so that substantially only oxidized regions and corrosion are removed from the immersion portion 231 of the plurality of rotatable components 230. The electrolytic compound is a basic solution selected from the group consisting of, but not limited to, sodium, potassium, phosphate, bicarbonate, sulfate, chloride, calcium, and magnesium. In another embodiment, the buffered electrolytic solution 221 includes water, sugar, electrolytes, glycerol, and pyruvate. In a preferred embodiment, the buffered electrolytic solution 221 includes a commercially available sports beverage that includes electrolytes, such as Gatorade®, available from PepsiCo®.

In one embodiment, a plurality of the immersion portions 231 of the plurality of rotatable components 230 are immersed in the buffered electrolytic solution 221 at the same time. In another embodiment, the plurality of rotatable components 230 includes compressor blades, which do not have a thermal barrier coating, such as is found on a turbine blade. In one embodiment, a composition of the plurality of rotatable components 230 differs along a length of the turbine assembly 210. Suitable compositions for the plurality of rotatable components 230 include, but are not limited to, high content steel, such as GTD 450, and titanium.

In another embodiment, a rotor drive 250 continuously rotates the turbine assembly 210 on the roller supports 202. The rotation of the turbine assembly 210 rotates the plurality of the immersion portions 231 through the buffered electrolytic solution 221 while electrical energy is applied. In one embodiment, the turbine assembly 210 is intermittently rotated by the rotor drive 250. The rotation of the turbine assembly 210 includes a predetermined maximum speed. The predetermined maximum speed is a functional limitation, preventing the buffered electrolytic solution 221 from splashing out of the stationary tank 222. The predetermined maximum speed includes, but is not limited to, between about 1 and about 4 rotations per minute (RPM), between about 2 and about 4 RPM, between about 1 and about 3 RPM, between about 0.5 and about 1.5 RPM, between about 1 and about 2 RPM, between about 2 and about 3 RPM, between about 3 and about 4 RPM, or any suitable combination, sub-combination, range, or sub-range thereof.

Figure 3:
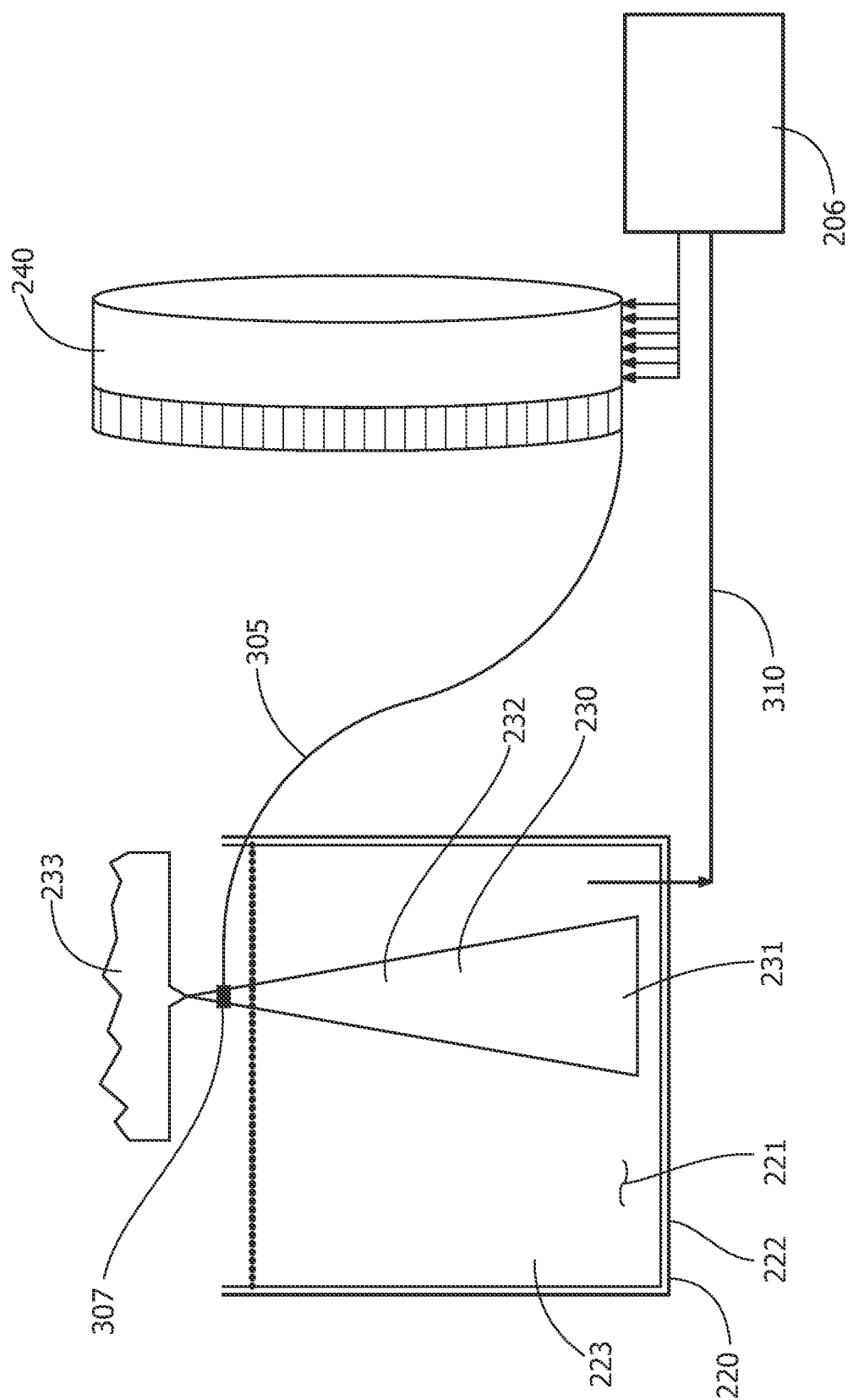
FIG. 3 is a schematic view of a DC power circuit for the refurbishing system.

Referring to FIG. 3, in one embodiment, the power distribution ring 240 controls electrical energy flowing from the DC power supply 206 to the immersion portion 231 of each of the plurality of rotatable components 230. The power distribution ring 240 is individually tailored for a specific configuration of each of the turbine assemblies 210. In one embodiment, a plurality of the power distribution rings 240 are attached to the power supply 206. A power supply lead 305 electrically couples the power distribution ring 240 to the immersion portion 231. The DC current from the power supply 206 passes to the power distribution ring 240, through the plurality of rotatable components 230 into the buffered electrolytic solution 221, and a ground 310 returns the DC current from the buffered electrolytic solution 221. The circuit includes the DC power supply 206 to the power distribution ring 240 to the plurality of rotatable components 230, and from electro-polishing tank 220 to negative. The plurality of rotatable components 230 passing into the buffered electrolytic solution 221 while the DC current is applied completes the circuit. The power supply 206 may be any conveniently available power supply found at the site. Usually, weld power supplies are readily available and are fully suitable as a source.

The DC current through each of the power supply leads 305 is individually controlled by the power distribution ring 240. A DC current flux is modulated by the DC power supply 206 to maximize electro-polish rate while limiting over-heating of the immersion portion 231. In one embodiment, the plurality of rotatable components 230 having a titanium composition require a different current density than the plurality of rotatable components 230 having a high content steel. In one embodiment, the power supply leads 305 are grouped into stages, each stage supplying the DC current to a group of the plurality of rotatable components 230. In a further embodiment, the power supply leads 305 are grouped by the size of the plurality of rotatable components 230. In one embodiment, the power distribution ring 240 distributes the DC current to the stage associated with the group of the plurality of rotatable components 230 immersed in the buffered electrolytic solution 221. Distributing the DC current only to the group of the plurality of rotatable components 230 immersed in the buffered electrolytic solution 221 eliminates an overheating and/or burning of the plurality of rotatable components 230 not immersed in the buffered electrolytic solution 221. In one embodiment, immersion of the plurality of rotatable components 230 in the buffered electrolytic solution 221 completes a circuit, and removing the plurality of rotatable components 230 from the buffered electrolytic solution 221 breaks the circuit, preventing the DC current from flowing through the plurality of rotatable components 230 not immersed in the buffered electrolytic solution 221.

The DC current being passed through the electro-polishing region 215 increases a temperature of the electro-polishing region 215, which is transferred by conduction to the buffered electrolytic solution 221. In one embodiment, a heat transfer mechanism may result in an increase in the temperature sufficient to cause the buffered electrolytic solution 221 to boil, evaporating the buffered electrolytic solution 221. The evaporation of the buffered electrolytic solution 221 may lower a volume below the predetermined volume level. In another embodiment, the rotation of the turbine assembly 210 may remove a portion of the buffered electrolytic solution 221 from the stationary tank 222, lowering the volume of the buffered electrolytic solution 221 below the predetermined volume level. Additional buffered electrolytic solution 221 is added to the stationary tank 222 to maintain the predetermined volume level. In another embodiment, the buffered electrolytic solution 221 is cooled to maintain a temperature below a boiling point of the buffered electrolytic solution 221. In still another embodiment, the temperature of the buffered electrolytic solution 221 may be cooled to minimize losses due to evaporation at a suitable temperature well below the boiling point of the buffered electrolytic solution 221.

Figure 4:
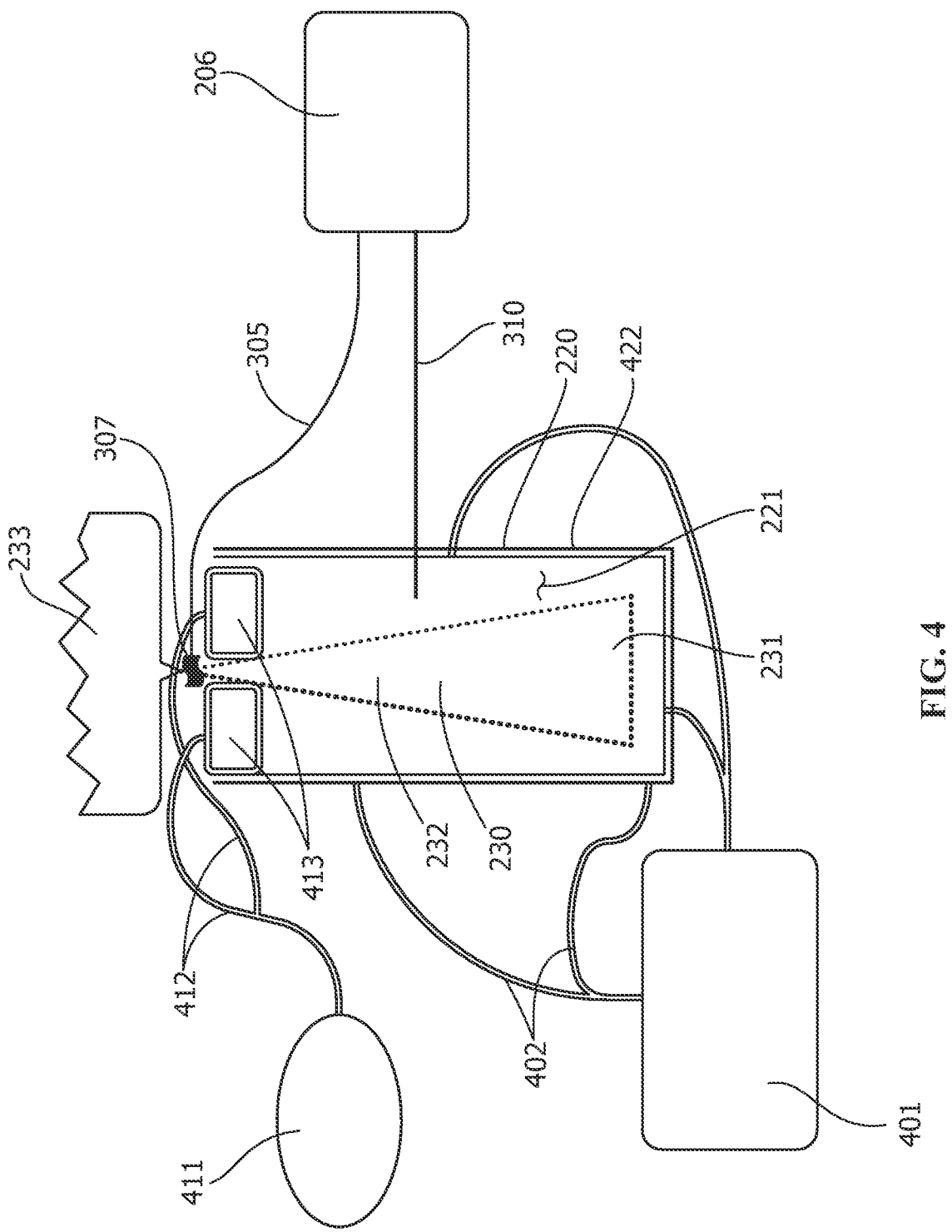
FIG. 4 is a perspective view of a refurbishing system.

Referring to FIG. 4, in one embodiment, the electro-polishing tank 220 is one or more electro-polish mitts 422 having one or more pneumatic bladder end seals 413 that slide over the plurality of rotatable components 230. During a planned inspection an upper casing of the turbomachine 200 is removed, providing access to the turbine assembly 210 (step 100) having the plurality of rotatable components 230 attached to the compressor discs 233. The plurality of rotatable components 230 are hand cleaned and the electro-polish mitts 422 are individually positioned over one or more of the plurality of rotatable components 230. An air bladder pump 411 is coupled to the pneumatic bladder end seals 413 through air bladder tubes 412. The air bladder pump 411 inflates the pneumatic bladder end seal 413, creating a liquid tight seal between the plurality of rotatable components 230, the pneumatic bladder end seal 413, and the electro-polish mitt 422. An electrolyte supply tank 401 fills the electro-polish mitt 422 with the buffered electrolytic solution 221 (step 110), immersing the immersion portion 231 of the plurality of rotatable components 230 in the buffered electrolytic solution 221 (step 130). A plurality of buffered electrolytic solution tubes 402 may supply the buffered electrolytic solution 221 to, and remove the buffered electrolytic solution 221 from, the electro-polish mitt 422. In another embodiment, the electro-polish mitt 422 includes an integral fluid cooling apparatus. The integral fluid cooling apparatus reduces the temperature of the buffered electrolytic solution 221 as it is removed from the electro-polish mitt 422 and before it is returned to the electro-polish mitt 422. In still another embodiment, a fluid cooling apparatus may be attached to electrolyte supply tank 401 to maintain the electrolyte in supply tank 401 at a predetermined temperature.

In one embodiment, the power supply lead 305 couples each of the plurality of rotatable components 230 in the electro-polish mitt 422 to the power supply 206 (step 120). A clamp 307 affixed to the distal end of the power supply lead 305 is detachably secured to the plurality of rotatable components 230. The DC current is passed from the DC power supply 206 through the power supply lead 305 to the plurality of rotatable components 230, through the plurality of rotatable components 230 into the buffered electrolytic solution 221, and from the buffered electrolytic solution 221 through the ground 310 to the power supply 206 (step 140). Passing of the DC current through the plurality of rotatable components 230 electro-polishes the immersed portion(s) 231 (step 150) in the buffered electrolytic solution 221. Upon completion of electro-polishing the immersed portion(s) 231 (step 150), the buffered electrolytic solution 221 is removed from the electro-polish mitt 422 (step 160), the pneumatic bladder end seal 413 is vented, and the electro-polish mitt 422 is removed from the plurality of rotatable components 230. The corrosion inhibitor is spray applied to the plurality of rotatable components 230 (step 170) having the electro-polishing region 215 with the predetermined finish.

As the turbine assembly 210 is refurbished the electro-polishing region 215 releases sediment/corrosion products/oxides, hereinafter referred to simply as sediment, into the buffered electrolytic solution 221. The sediment is formed from an electrochemical dissociation of an outer layer of the electro-polishing region 215. In one embodiment, the sediment settles to a bottom of the electro-polishing tank 220. In one embodiment, the sediment is filtered from the electro-polishing tank 220. In a further embodiment, the sediment is filtered by a cooling system in the electro-polishing tank 220 which also cools the buffered electrolytic solution 221.

In one embodiment, the buffered electrolytic solution 221 is maintained at a pH level between about 6 and about 8. In another embodiment, the buffered electrolytic solution 221 is maintained at a pH level between about 6.5 and about 7.5. In a preferred embodiment, the buffered electrolytic solution 221 is maintained at a pH level between about 6.75 and about 7.25. To maintain the pH level, the additional buffered electrolytic solution 221 added to the electro-polishing tank 220 may be adjusted to account for an increase in a concentration of the electrolytic compound after evaporation by inclusion of water or dilute concentrations of the buffered electrolytic solution 221.

In one embodiment, the power supply leads 305 are adjacent to the sub-shaft 211 and held in place with tie wraps. The clamp 307 is affixed to a distal end of the power supply lead 305, detachably securing the power supply lead 305 to the plurality of rotatable components 230. The clamp 307 on the distal end of the power supply lead 305 contacts only the plurality of rotatable components 230. A gap exists between the plurality of rotatable components 230 and the compressor disc 233. The gap forms a current barrier between the compressor disc 233 and the plurality of rotatable components 230. The current barrier prevent a welding of the compressor disc 233 to the plurality of rotatable components 230.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for refurbishing components, comprising:
    (a) accessing a plurality of rotatable components attached to a turbine assembly, the turbine assembly being a portion of a turbomachine, each of the plurality of rotatable components comprising a rotatable disc with rotor blades extending from the disc;
    (b) providing a predetermined volume of a buffered electrolytic solution in an electro-polishing tank;
    (c) coupling the plurality of rotatable components to a power supply;
    (d) immersing an immersion portion of at least one of the rotor blades in the buffered electrolytic solution;
    (e) passing an electrical energy through the immersion portion of at least one of the rotor blades while the immersion portion is immersed in the buffered electrolytic solution, wherein an electrical flux to the immersion portion electro-polishes the immersion portion;
    (f) separating the immersion portion from the buffered electrolytic solution; and
    (g) applying a corrosion inhibitor to the plurality of rotor blades.

2. The method of claim 1, further comprising removing the turbine assembly from the turbomachine and placing the turbine assembly on roller supports.

3. The method of claim 2, further comprising situating the electro-polishing tank below the turbine assembly.

4. The method of claim 3, further comprising two or more compartments in the electro-polishing tank.

5. The method of claim 4, wherein each compartment includes a predetermined volume of the buffered electrolytic solution.

6. The method of claim 4, further comprising a different buffered electrolytic solution in each compartment.

7. The method of claim 2, further comprising rotating the turbine assembly through use of a rotor drive.

8. The method of claim 7, further comprising continuously rotating the turbine assembly.

9. The method of claim 7, further comprising intermittently rotating the turbine assembly.

10. The method of claim 2, further comprising a power distribution ring supplying the DC current from the power supply to the immersion portion.

11. The method of claim 10, further comprising more than one power distribution ring.

12. The method of claim 1, further comprising removing an upper casing of the turbomachine and exposing the plurality of rotatable components.

13. The method of claim 12, wherein the plurality of rotatable components are rotor blades, each rotor blade further comprising a platform section affixed to the rotatable disc and an airfoil section extending from the platform section.

14. The method of claim 13, further comprising electro-polish mitts having pneumatic bladder end seals positioned over the immersion portion of rotor blades, wherein the immersion portion is the airfoil section of each rotor blade immersed in the buffered electrolytic solution.

15. The method of claim 14, further comprising an air bladder pump inflating the pneumatic air bladder seals in the electro-polish mitts, the air bladder seals creating a liquid tight seal.

16. The method of claim 15, further comprising an electrolyte supply tank, a plurality of electrolytic solution tubes supplying the electro-polish mitts with buffered electrolytic solution and removing buffered electrolytic solution from the electro-polish mitts.

17. The method of claim 1, wherein the each of the rotor blades is electro-polished at one time.

18. The method of claim 1, wherein the power supply is a DC welding unit.

19. The method of claim 1, wherein the buffered electrolytic solution further comprises an electrolytic compound.

20. The method of claim 19, wherein the electrolytic compound further comprises an electrolyte selected from the group consisting of sodium, potassium, phosphate, bicarbonate, sulfate, chloride, calcium, and magnesium.

21. The method of claim 1, wherein the buffered electrolytic solution includes water, sugar, electrolytes, glycerol and pyruvate.

22. The method of claim 1, wherein the buffered electrolytic solution includes a commercially available sports beverage such as Gatorade®.

23. The method of claim 1, wherein the buffered electrolytic solution has a pH level between 6 and 8.

24. The method of claim 1, wherein the buffered electrolytic solution is cooled to maintain a predetermined temperature.

25. The method of claim 1, wherein the electrical energy comprises DC current.

26. An electro-polishing apparatus, comprising:
    two roller supports for supporting a turbine assembly;
    a rotor drive for rotating the turbine assembly on the roller supports;
    an electro-polishing tank positioned below the turbine assembly;
    a buffered electrolytic solution in the electro-polishing tank;
    a DC power supply for providing an electrical energy;
    a power distribution ring coupled to the DC power supply, the power distribution ring distributing the electrical energy from the DC power supply; and power leads, the power leads coupling the power distribution ring to a plurality of rotatable components of the turbine assembly;

wherein the rotatable components comprise a rotatable disc with rotor blades extending from the disc.

27. An electro-polishing apparatus, comprising:

at least one electro-polish mitt having at least one pneumatic bladder end seal configured to slide over at least one rotor blade in a rotatable rotor assembly removed from service, the rotor assembly comprising rotor blades attached to and extending from a rotatable rotor disc;

an electrolyte supply tank;

a buffered electrolytic solution in the electrolytic supply tank; and buffered electrolytic solution tubes providing fluid communication between the electrolyte supply tank and the at least one electro-polish mitt, the tubes cycling the buffered electrolytic solution between the electro-polish mitt and the supply tank.

28. The electro-polishing apparatus of claim 27 further including an air bladder pump coupled to the at least one pneumatic bladder end seal, the air bladder pump providing air to inflate the pneumatic bladder and seal against the at least one rotor blade.

29. The electro-polishing apparatus of claim 27 further including a DC power supply for providing an electrical energy through the at least one of rotor blade.

30. The electro-polishing apparatus of claim 29 further including power leads, the power leads coupling the DC power supply to at least one of the plurality of rotor blades.

31. The electro-polishing apparatus of claim 27 further including an integral electrolytic solution cooling apparatus.

32. A method for refurbishing components, comprising:

(a) accessing a plurality of rotor blades attached rotatable discs in a turbine assembly, the turbine assembly being a portion of a turbomachine;

(b) hand cleaning the plurality of rotor blades;

(c) providing an electro-polishing tank comprising at least one electro-polish mitt having at least one pneumatic bladder end seal that slides over the plurality of rotor blades;

(d) individually positioning the at least one electro-polish mitt over at least one of the rotor blades;

(e) inflating the at least one pneumatic bladder end seal with an air bladder pump to create a liquid tight seal between the at least one rotor blade, the at least one pneumatic bladder end seal, and the at least one electro-polish mitt;

(f) filling the at least one electro-polish mitt with a buffered electrolytic solution to immerse an immersion portion of the at least one rotor blade in the buffered electrolytic solution;

(g) coupling the at least one rotor blade in each of the at least one electro-polish mitts to a power supply;

(h) passing an electrical energy through the immersion portion of at least one at least one rotor blade in each of the at least one electro-polish mitts while the immersion portion is immersed in the buffered electrolytic solution;

(i) removing the buffered electrolytic solution from the at least one electro-polish mitts;

(j) venting the pneumatic bladder end seal;

(k) removing the at least one electro-polish mitt from the at least one rotor blade; and (l) applying a corrosion inhibitor to the plurality of rotor blade;

wherein an electrical flux applied to the immersion portion by the power supply electro-polishes the immersion portion.

33. The method of claim 32, further comprising filling the at least one electro-polish mitt with the buffered electrolytic solution from an electrolyte supply tank.

34. The method of claim 33, further comprising supplying the buffered electrolytic solution to, and removing the buffered electrolytic solution from, the electro-polish mitt with a plurality of buffered electrolytic solution tubes.

35. The method of claim 34, further comprising reducing the temperature of the buffered electrolytic solution with an integral fluid cooling apparatus as the buffered electrolytic solution is removed from the electro-polish mitt and before it is returned to the electro-polish mitt.

36. The method of claim 33, further comprising maintaining the buffered electrolytic solution in the supply tank at a predetermined temperature with a cooling fluid.

* * * * *